W. J. INNIS.
Wrenches.

No 142,570. Patented September 9, 1873.

Witnesses.

Inventor.
William J. Innis

UNITED STATES PATENT OFFICE

WILLIAM J. INNIS, OF OIL CITY, PENNSYLVANIA.

IMPROVEMENT IN WRENCHES.

Specification forming part of Letters Patent No. 142,570, dated September 9, 1873; application filed April 18, 1873.

*To all whom it may concern:*

Be it known that I, WILLIAM J. INNIS, of Oil City, in the county of Venango and State of Pennsylvania, have invented a certain new Improvement in Wrenches, of which the following is a full, clear, and exact description:

The nature of my invention consists in the novel construction of the ferrules and main bar of monkey-wrenches, the object being to lock the ferrules firmly on the main bar of wrenches, thereby preventing any lateral movement of the sliding jaw, except when operated by the screw; also, to transfer the end thrust of the screw to the main bar, and thus relieve the handle and end nut from the strain when in operation.

Figure 1:
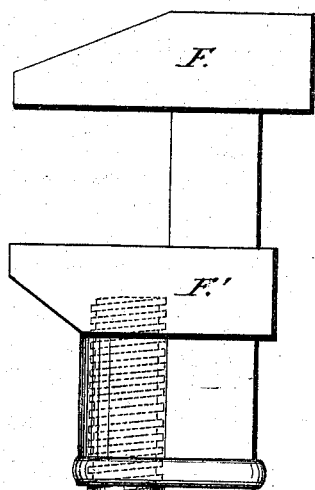
Figure 2:
Figure 3:
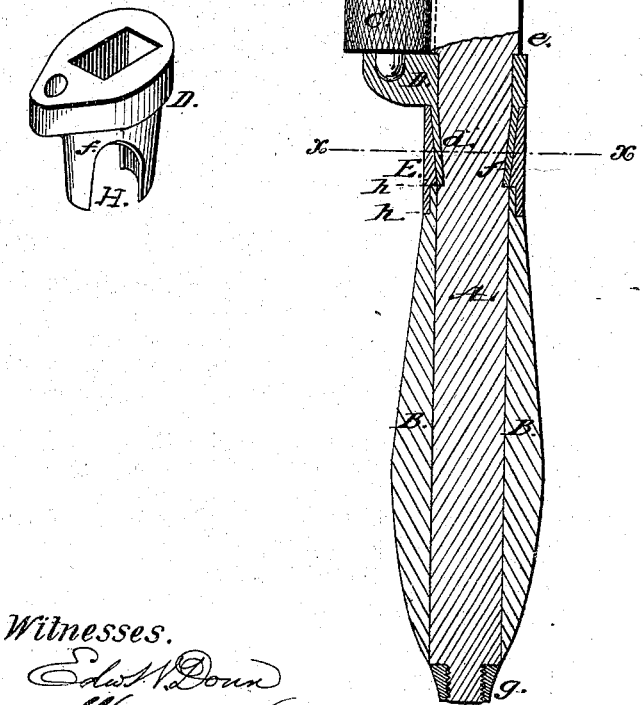

Figure 1 of the drawing represents a vertical view of my invention, partly in section. Fig. 2 represents a plan view of the same taken at $x$ $x$, Fig. 1. Fig. 3 represents a perspective view of the "pressure-ferrule" taken in detail.

A of the drawing represents the main bar. B B represent the handle. C is the rosette-headed screw. D is the upper part of the interior or pressure collar. $d$ is the clasping portion of said collar. E is the exterior ferrule. F is the head of the wrench. F' is the sliding head or jaw. H represents vertical openings in ferrule D. $g$ is the nut. $e$ is the shoulder of main bar. $f$ is an incline on main bar. $h$ $h$ are shoulders of handle B, which holds the ferrule E in place.

The main bar A is provided with an incline, $f$, having a shoulder at its lower end for the purpose of forming a bearing for the lower ends of collar D; said collar is then slipped on bar A to its place. The lower part of collar D has two (more or less) vertical openings, H, for the purpose of allowing the two opposite sides of said collar to be forced together, and made to clasp the main bar on its incline, thus securely locking it between the shoulders of bar A. On the exterior of collar D is an additional ferrule, E, made tapering to conform with the collar when said collar is forced into the incline on bar A. The lower end of ferrule E is recessed to receive the handle B, which, by means of nut $g$, holds ferrule E to its place.

What I claim as new, and desire to secure by Letters Patent, is—

1. The collar D $d$, having one or more openings, H, for the purpose of reducing the diameter of the same, so as to firmly clasp bar A, as set forth.

2. The collar D, ferrule E, bar A, in combination with handle B, for the purpose set forth.

WILLIAM J. INNIS.

Witnesses:
NORRIS PETERS,
HENRY R. WALTON.